United States Patent
Weaver

(10) Patent No.: US 7,301,612 B2
(45) Date of Patent: Nov. 27, 2007

(54) OPTICAL NETWORK AND METHOD INCLUDING SELF-TEST CAPABILITY

(75) Inventor: Thomas L Weaver, Webster, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/200,293

(22) Filed: Aug. 9, 2005

(65) Prior Publication Data

US 2007/0036543 A1    Feb. 15, 2007

(51) Int. Cl.
*G01N 21/00* (2006.01)
(52) U.S. Cl. .................................... 356/73.1
(58) Field of Classification Search ............. None
See application file for complete search history.

(56) References Cited

U.S. PATENT DOCUMENTS

| | | | |
|---|---|---|---|
| 5,177,354 A * | 1/1993 | Tomita et al. | 250/227.15 |
| 5,825,792 A | 10/1998 | Villeneuve et al. | |
| 5,838,470 A | 11/1998 | Radehaus et al. | |
| 5,963,312 A * | 10/1999 | Roberts | 356/73.1 |
| 6,548,806 B1 | 4/2003 | Chung et al. | |
| 6,961,128 B2 | 11/2005 | Park | |
| 2003/0016413 A1 | 1/2003 | Carrick et al. | |
| 2003/0063636 A1 | 4/2003 | Sasaki | |
| 2003/0072053 A1 | 4/2003 | Weaver et al. | |
| 2003/0152390 A1 | 8/2003 | Stewart et al. | |
| 2004/0196534 A1 | 10/2004 | Obeda et al. | |

FOREIGN PATENT DOCUMENTS

WO    WO 00 38283    6/2000

OTHER PUBLICATIONS

Dermis, Thomas F.; Nalepka, Joseph P.; Thompson, Daniel B.; and Dawson, David E.; Article "Fly-by-Light: The Future of Flight Control Technology," undated.

* cited by examiner

*Primary Examiner*—Tu T. Nguyen
(74) *Attorney, Agent, or Firm*—Harness, Dickey & Pierce, P.L.C.

(57) ABSTRACT

An optical Wavelength Division Multiplexing (WDM) network system having a built-in self-testing capability of all optical paths in the network. A test signal generator is used to apply a low frequency test signal to a plurality of transmitters of the system. The test signal is impressed by each transmitter onto an optical data signal to form a composite optical signal having a data component and a test component. A plurality of receivers each include high-pass and low-pass filters that are used to separately extract the data and test components, respectively, of the received signals. The test components are then fed to a health monitoring circuit. The system and method enables every path used in the network to be monitored for integrity in real time, and without introducing a large plurality of duplicative components into the network system.

19 Claims, 2 Drawing Sheets

OPTICAL NETWORK AND METHOD INCLUDING SELF-TEST CAPABILITY

CROSS-REFERENCE TO RELATED APPLICATIONS

This present invention is generally related to the subject matter of U.S. patent application Ser. No. 10/845,398 now U.S. Pat. No. 7,030,975, filed May 13, 2004 and assigned to The Boeing Company.

FIELD OF THE INVENTION

The present invention relates to optical networks, and more particularly to an optical network incorporating a self-test capability for monitoring, in real time, the integrity of each channel of the network.

BACKGROUND OF THE INVENTION

Optical Wavelength Division Multiplexing (WDM) has the potential to significantly improve network capability and reliability via redundancy. Redundancy is particularly important in critical applications, such as on mobile platforms of various forms, and particularly in aircraft and aerospace applications. However, to be useful, WDM networks must be maintainable. Optical Link Loss (OLL) measuring and Optical Time Domain Reflectometry (OTDR) are powerful techniques for diagnosing the health of the passive elements of a photonic network, such as fiber optic cables. However, WDM networks present new troubleshooting and maintenance challenges because applying the above-described techniques can be a complex process. The reason for the complexity is that no one wavelength of a WDM network can be used to probe all paths through a network. This is because a given wavelength will rarely be present in every single path in a complex optical network. Thus, a source for providing a test signal for every wavelength present in the network must be provided. In aircraft and aerospace applications, the addition of multiple wavelength test signal sources into ground support equipment would make the equipment unacceptably expensive. The addition of multiple wavelength sources into on-board test systems is unacceptable due to the significant weight, volume and cost increases that such multiple wavelength sources would cause.

Accordingly, there still exists a need for an optical WDM network that enables every wavelength implemented in the network to be checked without the need for introducing significant additional test equipment. The ability to be able to test the network continuously, in real time, and without disrupting/affecting the transmission and reception of data over each path/channel of the network is also an important consideration.

SUMMARY OF THE INVENTION

The present invention is directed to an optical Wavelength Division Multiplexing (WDM) network that incorporates a built-in self-test capability for monitoring every wavelength used in the network. In one preferred form, the system includes a plurality of optical transmitters and a plurality of optical receivers. Each transmitter is associated with a single receiver and a single wavelength (i.e., channel), and coupled for communication via a suitable optical medium (for example, an optical fiber). Thus, for each channel, there is a transmitter and an associated receiver. A test signal generator is used to generate a low frequency optical test signal that is output to each of the transmitters. The test signal has a frequency that is significantly lower than the frequency of data that is input to each of the transmitters. The test signal and the data may be transmitted simultaneously as a single optical single by each transmitter to its associated receiver. Each receiver includes a filter for extracting the test signal. The test signal for each channel is output by each receiver to a network health monitoring subsystem. In this manner, each wavelength signal used in the network has transmitted with it a test signal. Analyzing the test signal associated with each wavelength signal enables the integrity of each channel of the network to be continuously monitored. Importantly, this may be performed in real time so that any problems with any one of the channels can be quickly identified.

It is a significant advantage of the present invention that every wavelength used with the network can be monitored without the need for introducing significant additional test equipment into the network. The system and method of the present invention can be implemented using only a single test signal generator for generating a test signal to each of the transmitters. The receivers are able to extract the test signal by each implementing a filter. Thus, the complexity and cost of the overall network is not significantly increased. The system and method is especially useful in applications where weight and space are important considerations, for example, mobile platforms, such as aircraft and aerospace vehicles.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
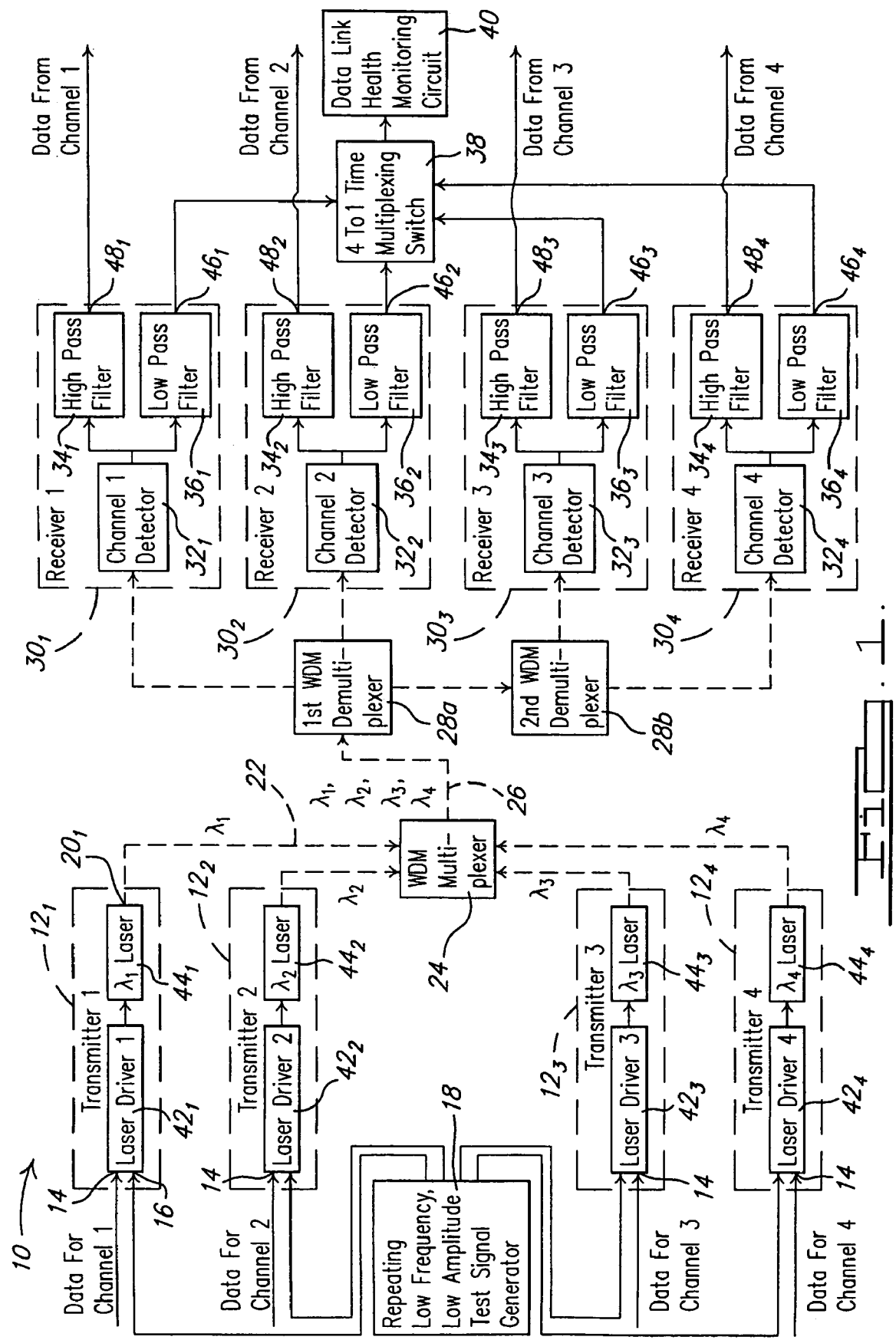
FIG. 1 is a simplified block diagram of a preferred embodiment of the present invention.

Referring to FIG. 1, a system 10 is shown in accordance with a preferred embodiment of the present invention. The system 10 generally forms an optical Wavelength Division Multiplexing (WDM) network having a built-in self-test system. The system 10 generally includes a plurality of optical transmitters 12 that each receive an electrical data signal at an input 14. While only four transmitters are illustrated, it will be appreciated that a greater or lesser plurality could be employed, depending on the number of different wavelengths implemented in the system 10. Each transmitter 12 also receives a low frequency, low amplitude test signal on an input 16 thereof from a repeating, low amplitude test signal generator 18. An output 20 of each transmitter 12 transmits an optical data signal as well as the optical test signal over a suitable optical medium, such as an optical fiber 22, to a WDM multiplexer 24. The WDM multiplexer 24 transmits the optical data signal and the optical test signal transmitted on each channel over a suitable optical medium, such as an optical fiber 26, to a first WDM demultiplexer 28a. It will be appreciated that while a single signal generator 18 is shown, an alternative implementation could make use of a plurality of test signal generators, one each for each of the optical transmitters 12. Also, while the system 10 is not limited to use on mobile platforms, it is especially well-suited for use on a mobile platform because it does not add significant weight or bulk to an optical system. Thus, the system 10 is especially well-suited for use on aircraft and airborne vehicles, where weight and space are important considerations.

With further reference to FIG. 1, the first WDM demultiplexer 28a demultiplexes the data/test signals for channels 1 and 2 and provides outputs to optical receivers $30_1$ and $30_2$. Second WDM demultiplexes the data/test signals for channels 3 and 4 and provides outputs to receivers $30_3$ and $30_4$. Each receiver 30 includes a detector 32 for detecting the wavelength signal associated with its specific channel. For example, detector $32_1$ detects when wavelength $\lambda_1$ is being provided by the WDM demultiplexer 28. Each receiver 30 also includes a high-pass electric filter 34 and a low-pass electric filter 36 that both receive an output from their associated detector 32. The outputs of each of the low-pass electric filter $36_1$-$36_4$ are output to a multiplexing switch 38 that multiplexes the received signals to generate output signals that are applied to a health monitoring circuit 40.

With further reference to FIG. 1, each transmitter 12 includes a laser driver 42, from, for example, Newport Corp., and a laser 44, from, for example, Newport Corp., or JDS Uniphase. The repeating test signal generator 18 preferably generates an optical signal having a frequency of preferably between about 1 KHz-30 KHz, and more preferably about 20 KHz; and an amplitude of approximately 10% of the digital signal amplitude. The data signals applied to each input 14 of each transmitter 12 are signals typically much higher in frequency, typically about 0.5 GHz-4.0 GHz. Thus, each wavelength signal that is generated at each output 20 of each transmitter 12 is a "composite" signal that comprises two components: a data component and a test component. Put differently, each wavelength data signal has the test signal impressed on it. Accordingly, regardless of the number of wavelengths used, each wavelength data signal has associated with it a low frequency test signal component.

In operation, data to be transmitted is input to each of the transmitters 12 at its associated input 14. Simultaneously, the repeating test signal is also generated by the repeating test signal generator 18 and applied to input 16 of each of the transmitters 12. Each transmitter 12 uses the data and test signal components to generate an optical signal at output 20 thereof, which is then applied over the optical fiber 22 to the WDM multiplexer 24. The WDM multiplexer 24 transmits each of the optical signals from each of the transmitters $12_1$-$12_4$ to the first WDM demultiplexer 28a in FIG. 1. The first WDM demultiplexer 28a extracts some of the optic signals and sends them to the upper set of channel detectors $32_1$-$32_2$. The other optic signals remain in the optical fiber and continue on to the second WDM demultiplexer 28b in FIG. 1. The second WDM demultiplexer 28b demultiplexes the remaining signals, which are then detected by the channel detectors $32_3$-$32_4$ of each of the receivers $30_3$-$30_4$.

Each channel detector $32_1$-$32_4$ generates an electrical output signal that includes the data component applied to transmitter 12 associated with its specific channel, as well as the test signal component generated by the repeating test signal generator. The electrical signal is applied to each of the high-pass electric filter 34 and the low-pass electric filter 36. Each low-pass electric filter $36_1$-$36_4$ extracts the test signal component from the detected electrical signal and passes the extracted signal from an output $46_1$-$46_4$ to the multiplexing switch 38. Conversely, each high-pass electric filter $34_1$-$34_4$ extracts only the data signal component from the detected electrical signal and passes the data signal component to an output $48_1$-$48_4$. Thus, each electric filter 34, 36 forms a conventional band-pass filter that passes electrical signals below or above a predetermined frequency range. The data component is then placed onto the channel associated with the particular receiver $30_1$-$30_4$.

Of significance in the above description is that not all the optical signals traveled the same path in the system 10. By impressing a test signal on each data signal, all the optical paths were tested. By impressing a test signal on every data signal, and extracting the test signals at every detector, all optical paths in any system can be tested regardless of the topology of the network.

Figure 2:
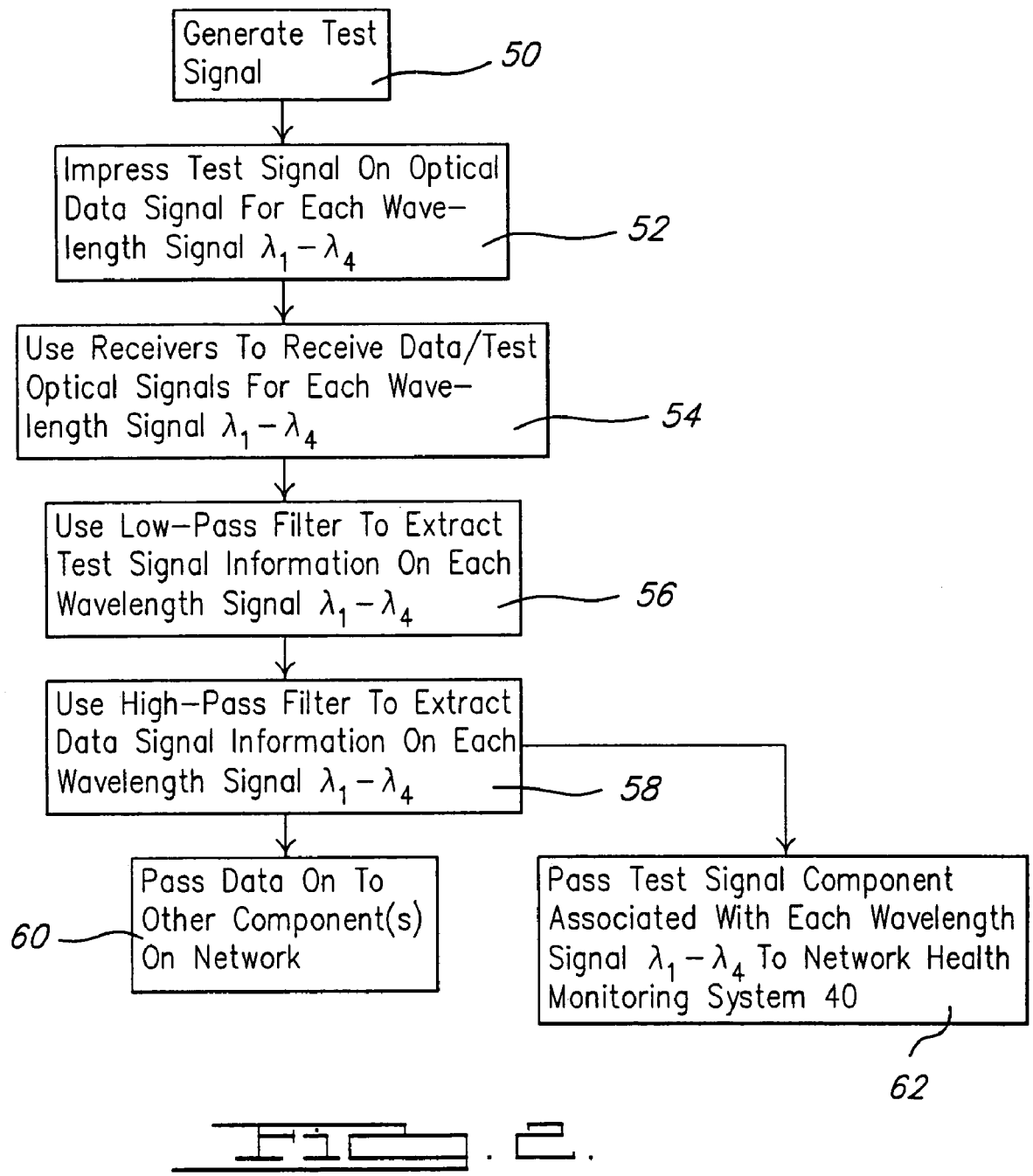
FIG. 2 is a flowchart of the major operations performed by the system of FIG. 1.

With brief reference to FIG. 2, a flow chart illustrating various operations performed by the system 10 is presented. Initially, the repeating test signal generator 18 generates a test signal, as indicated in operation 50. The test signal is then impressed on the data signal by the transmitters 12, as indicated in operation 52. The receivers 30 are then used to receive the composite optical data/test signals for each wavelength $\lambda_1$-$\lambda_4$, as indicated in operation 54. The low-pass electric filters 36 are then used to extract the test signal information from each detected signal, as indicated in operation 56. The high-pass electric filters 34 are used to extract the data signal component present on each detected signal, as indicated in operation 58. The data component of the detected signal is then passed on to other components, as indicated in operation 60, while the test signal component of each detected signal is then passed to the health monitoring circuit 40, as indicated in operation 62.

The system and method of the present invention thus provides a means for testing every wavelength signal (i.e., every optical path) utilized in an optical network without requiring a large plurality of duplicative components to be implemented. The system and method 10 is able to impress a test signal on each wavelength optical signal used in each optical path of an optical network by using only a single repeating test signal generator, and a pair of band-pass filters in each receiver of the system 10. This significantly simplifies and reduces the overall cost of implementing a network health monitoring system. The system and method 10 is especially well-suited for applications where space and weight are of paramount importance, such as on aircraft and aerospace vehicles. However, it will be appreciated that the system can be implemented in any WDM network, whether such a network is utilized on a land, marine or an airborne mobile platform, or on a terrestrial or fixed structure.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An optical network system incorporating a self test capability, the system comprising:

an optical transmitter for transmitting optical data signals over an optical channel;

an optical receiver associated with said optical transmitter for receiving optical data signals over said optical channel;

a test signal generator for generating a test signal component that is transmitted with said optical data signals over said optical channel to said optical receiver;

said optical transmitter including a driver adapted to impress both of said test signal and said optical data signals to an optical signal generating component, with said optical signal generating component adapted to transmit said data signals and said test signal at a common wavelength, but as different frequency signal components; and a first filter associated with said optical receiver for extracting only said test signal component received by said optical receiver; and a second filter for extracting only said optical data signals.

2. The system of claim 1, further comprising a plurality of optical transmitters each being respectively associated with one of a plurality of independent optical receivers to form a plurality of optical transmitter/receiver pairs for communicating optical signals over a respective optical channel; and each said optical receiver having a first filter for passing only said test signal component and a second filter for passing only said optical data signals.

3. The system of claim 2, further including a multiplexing switch for interfacing outputs of each said first filter to a monitoring system.

4. The system of claim 1, wherein said test signal component comprises an optical signal having a frequency of between about 1.0 KHz-30.0 KHz.

5. The system of claim 1, further comprising a network health monitoring system responsive to said test signal component extracted by said first filter.

6. The system of claim 1, wherein said first filter passes signals greater than about 500 MHz.

7. The system of claim 1, wherein said driver includes a laser driver adapted to receive both said test signal component and a data signal component.

8. The system of claim 7, wherein said optical signal generating component further comprises a laser responsive to said laser driver.

9. The system of claim 1, wherein the system is used on a mobile platform.

10. An optical network system incorporating a self test capability, the system comprising:

a plurality of optical transmitters for transmitting optical signals over a plurality of independent optical channels;

a plurality of optical receivers associated with said optical transmitters, each one of said optical receivers being independently associated with a specific single one of said optical transmitters to form a transmitter/receiver pair for communicating optical data signals over a predetermined one of said optical channels;

a test signal generator for generating an optical test signal component to each of said optical transmitters, said optical test signal components being transmitted at a common wavelength with said data signals over a given one of said optical channels by an associated one of said optical transmitters, wherein said one optical transmitter is associated with said one optical channel, and said optical test signal components further being of a different frequency than said optical data signals and being transmitted simultaneously with said optical data signals over said independent ones of said optical channels;

a first filter associated with each said optical receiver for extracting said optical test signal component received by each said optical receiver, and directing said optical test signal components to an external network health monitoring system and a second filter associated with each said optical receiver for extracting said optical data signals received by each said optical receiver.

11. The system of claim 10, further comprising a multiplexer responsive to an output of each said optical receiver for channeling said optical test signal components to said external network health monitoring system.

12. A method for operating a multi-channel optical network incorporating a self test capability, the method comprising:

generating a plurality of optical data signals;

generating a plurality of optical test signal components, each said optical test signal component being of a different frequency from an associated one of said optical data signals but having a common wavelength with its associated said optical data signals;

for each optical channel of said multi-channel network:

feeding both of said optical data signals and said optical test signal components into a driver independently associated with a single channel of said multi-channel optical network; and using said driver to generate an output signal for driving an optical signal generating component that generates an optical signal that is transmitted over said channel with said optical test signal and said optical data signals;

receiving said optical data signals and said optical test signal components over each of said optical channels;

for each said optical channel, filtering said optical test signal components from said optical signal to produce a first output, and filtering said optical data signal components from said optical signal to produce a second output; and forwarding said received optical test signals to a subsystem for further analysis.

13. The method of claim 12, wherein using said subsystem for further analysis comprises using a network health monitoring system to analyze said optical test signal components.

14. The method of claim 12, wherein generating a plurality of optical test signals comprises generating a plurality of optical test signals having a frequency of between about 1.0 KHz-30.0 KHz.

15. The method of claim 12, further comprising using said optical network on a mobile platform.

16. A method for forming a wavelength division multiplexing (WDM) optical network incorporating a self test capability, the method comprising:

using a plurality of optical transmitters to generate a plurality of data signals over a corresponding plurality of independent optical channels;

generating a plurality of repeating test signals and applying each of said optical test signals to said optical transmitters, said test signals and said data signals being simultaneously transmitted at a common wavelength over each said independent optical channel as a composite optical signal, each said test signal being of a different frequency from its associated said data signals;

receiving said composite optical signals transmitted over said independent optical channels;

using a first filter to filter said test signals from said composite optical signals;

using a second filter to filter said data signals from said composite optical signal; and using said test signals to evaluate a health of said WDM optical network.

17. The method of claim 16, further comprising using a network health monitoring system to receive said test signals and monitor a health of said WDM system in real time.

18. The method of claim 17, further comprising using a multiplexer responsive to an output of each said optical receiver to channel each said composite optical signal to said network health monitoring system.

19. The method of claim 18, further comprising using a filter to extract said data signals from said composite optical signals.

* * * * *